United States Patent
Yu et al.

(10) Patent No.: US 9,493,043 B2
(45) Date of Patent: Nov. 15, 2016

(54) TPMS SENSOR POSITION SETTING METHOD

(71) Applicant: CUB ELECPARTS INC., Changhua County (TW)

(72) Inventors: San-Chuan Yu, Changhua County (TW); Tsan-Nung Wang, Changhua County (TW); Chi-Hung Chen, Changhua County (TW); Chao-Ching Hu, Tainan (TW); Jyong Lin, Changhua County (TW); Tzu-Wen Ko, Changhua (TW); Hsiao-Ming Chen, Changhua County (TW); Ming-Hong Lin, Changhua County (TW); Eric Ma, Changhua County (TW)

(73) Assignee: CUB ELECPARTS INC., Changhua County (TW)

( * ) Notice: Subject to any disclaimer, the term of this patent is extended or adjusted under 35 U.S.C. 154(b) by 35 days.

(21) Appl. No.: 14/510,595

(22) Filed: Oct. 9, 2014

(65) Prior Publication Data
US 2015/0343859 A1 Dec. 3, 2015

(30) Foreign Application Priority Data

May 30, 2014 (TW) .............................. 103119154 A

(51) Int. Cl.
*B60Q 1/00* (2006.01)
*B60C 23/04* (2006.01)

(52) U.S. Cl.
CPC ....... *B60C 23/0461* (2013.01); *B60C 23/0472* (2013.01); *B60C 23/0479* (2013.01)

(58) Field of Classification Search
CPC .......... B60C 23/0433; B60C 23/0461; B60C 23/0471; B60C 23/0472; B60C 23/0479; B60C 23/02; B60C 23/04
USPC ............ 340/438, 442; 73/146, 146.2, 146.4; 116/34
See application file for complete search history.

(56) References Cited

U.S. PATENT DOCUMENTS

| | | | | |
|---|---|---|---|---|
| 6,243,007 B1* | 6/2001 | McLaughlin | ....... | B60C 23/0416 340/442 |
| 6,271,748 B1* | 8/2001 | Derbyshire | ......... | B60C 23/0401 340/442 |
| 6,414,592 B1* | 7/2002 | Dixit | .................. | B60C 23/0408 340/442 |
| 7,161,476 B2* | 1/2007 | Hardman | ............ | B60C 23/0433 340/10.33 |
| 7,250,852 B1* | 7/2007 | Kell | ..................... | B60C 23/0408 340/10.1 |
| 7,592,903 B2* | 9/2009 | Kochie | .................. | G07C 5/008 116/34 R |
| 8,692,661 B2* | 4/2014 | Deniau | ............... | B60C 23/0408 116/34 R |
| 8,742,914 B2* | 6/2014 | Deniau | ............... | B60C 23/0462 340/442 |
| 2002/0130771 A1* | 9/2002 | Osborne | ............... | B60C 23/005 340/438 |
| 2004/0041698 A1* | 3/2004 | Lin | ..................... | B60C 23/0408 340/447 |
| 2013/0038442 A1* | 2/2013 | Deniau | ................. | B60C 23/044 340/447 |
| 2013/0106596 A1* | 5/2013 | Mouchet | ................. | B60C 23/02 340/445 |
| 2014/0139332 A1* | 5/2014 | Mouchet | ............ | B60C 23/0479 340/442 |
| 2015/0015390 A1* | 1/2015 | McIntyre | ............ | B60C 23/0471 340/447 |

* cited by examiner

*Primary Examiner* — Eric M Blount
(74) *Attorney, Agent, or Firm* — Muncy, Geissler, Olds & Lowe, P.C.

(57) ABSTRACT

A TPMS (tire pressure monitoring system) sensor setting method is disclosed and performed by: using a setting tool to input a location code into the TPMS sensor to be set so that the TPMS sensor can feed the location code and its ID to the on-vehicle main unit for enabling the on-vehicle main unit to establish the relationship between the ID of the TPMS sensor and its location.

6 Claims, 3 Drawing Sheets

TPMS SENSOR POSITION SETTING METHOD

BACKGROUND OF THE INVENTION

1. Field of the Invention

The present invention relates to TPMS (tire pressure monitoring system) technology and more particularly, to a TPMS (tire pressure monitoring system) sensor position setting method.

2. Description of the Related Art

Currently, when setting the positions of TPMS sensors in a vehicle, it is to switch the on-vehicle main unit to a learning mode, and then to trigger the TPMS sensors subject to the sequence requested by the on-vehicle main unit, for example, the sequence of right front wheel→left front wheel→right rear wheel→left rear wheel. When the on-vehicle main unit received a response signal from the first TPMS sensor, it memorizes the ID of the TPMS sensor and its respective position, and then waits for receiving a second communication protocol. This operation procedure is repeated again and again till the on-vehicle main unit completed the learning of the positions of all vehicle wheels. For causing the TPMS sensor at each vehicle wheel to provide a signal, it needs to deflate the tire of the vehicle wheel to a level below a predetermined warning threshold pressure value. This operation procedure is complicated. The user needs to deflate the tires of the vehicle wheels of the vehicle one after another, and then to inflate the tires of the vehicle wheels of the vehicle to the normal pressure value one after another after the on-vehicle main unit finished the learning. Further, this method can simply set the ID and position of each TPMS sensor. It is not applicable to set the warning threshold temperature value, warning threshold pressure value or other warning detection factors. Therefore, there is a strong demand for an improved setting method.

SUMMARY OF THE INVENTION

The present invention has been accomplished under the circumstances in view. It is the main object of the present invention to provide a TPMS sensor position setting method, which facilitates rapid setting without deflating and then inflating the tire of the vehicle wheel.

It is another object of the present invention to provide a TPMS sensor position setting method, which enables the warning temperature threshold value to be set when setting the location of the TPMS sensor.

It is still another object of the present invention to provide a TPMS sensor position setting method, which enables the warning pressure threshold value to be set when setting the location of the TPMS sensor.

To achieve these and other objects of the present invention, a TPMS sensor position setting method of the invention is performed by: using a setting tool to input a location code into the TPMS sensor to be set so that the TPMS sensor can feed the location code and its ID to the on-vehicle main unit for enabling the on-vehicle main unit to establish the relationship between the ID of the TPMS sensor and its location.

Other advantages and features of the present invention will be fully understood by reference to the following specification in conjunction with the accompanying drawings, in which like reference signs denote like components of structure.

DETAILED DESCRIPTION OF THE INVENTION

Figure 1:
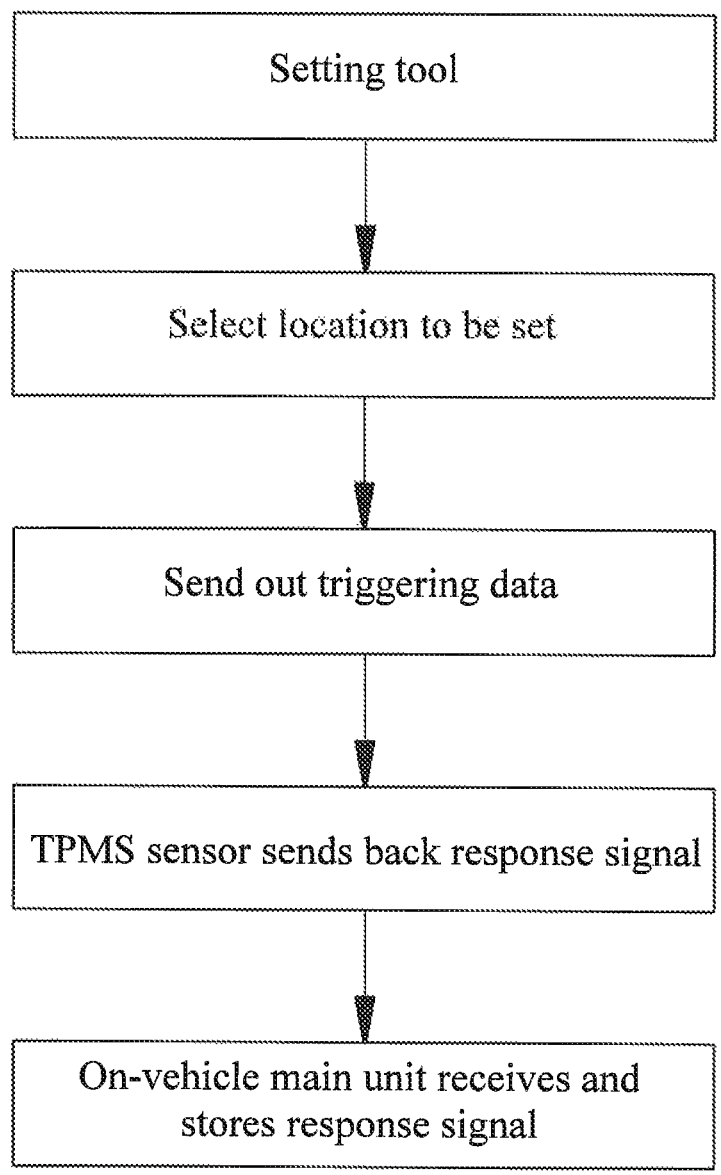
FIG. 1 is an operational flow chart of a TPMS sensor positioning setting method in accordance with a first embodiment of the present invention.

Referring to FIG. 1, a TPMS (tire pressure monitoring system) sensor position setting method in accordance with a first embodiment of the present invention comprises the following steps:

A. Provide a setting tool that comprises an operating interface 11, a display interface 12 and a low-frequency transmitter unit 13.

B. Operate the operating interface 11 of the setting tool to select the position of the TPMS sensor to be set, for example, left front wheel for the position of the TPMS sensor to be set.

C. Approach the setting tool toward the wheel (left front wheel) of the vehicle to be set, enabling the setting tool to transmit a triggering data to trigger the TPMS sensor in the wheel of the vehicle wirelessly, wherein the triggering data comprises a trigger signal and a location code. The trigger signal can be a convex wave or actuation code, D. After received the triggering data, the TPMS sensor stores the location code of the triggering data provided by the setting tool, and then feeds back to the on-vehicle main unit a response signal containing the location code, the ID of the TPMS sensor and at least one of physical information measured by the TPMS sensor such as the temperature, pressure or acceleration value.

E. After received the response. signal from the TPMS sensor, the on-vehicle main unit links the ID to the location code and stores them in a memory therein to finish the setting of the TPMS sensor, and thus, the on-vehicle main unit will be able to learn the relationship between tire ID of the TPMS sensor and its location.

Before the setting procedure, the on-vehicle main unit must be switched from the normal mode to the learning mode.

Further, the format of the location code can be set subject to the model of the on-vehicle main unit.

According to the method of the present invention, every TPMS sensor is not only to passively provide its ID and related physical information to the on-vehicle main unit. Upon receipt of a triggering data from the setting tool, every TPMS sensor will actively provide its location information to the on-vehicle main unit. After received a response signal from each TPMS sensor, the on-vehicle main unit makes sure of the location relationship of all the installed TPMS sensors. This is very different from the conventional TPMS sensor position setting methods.

Figure 2:
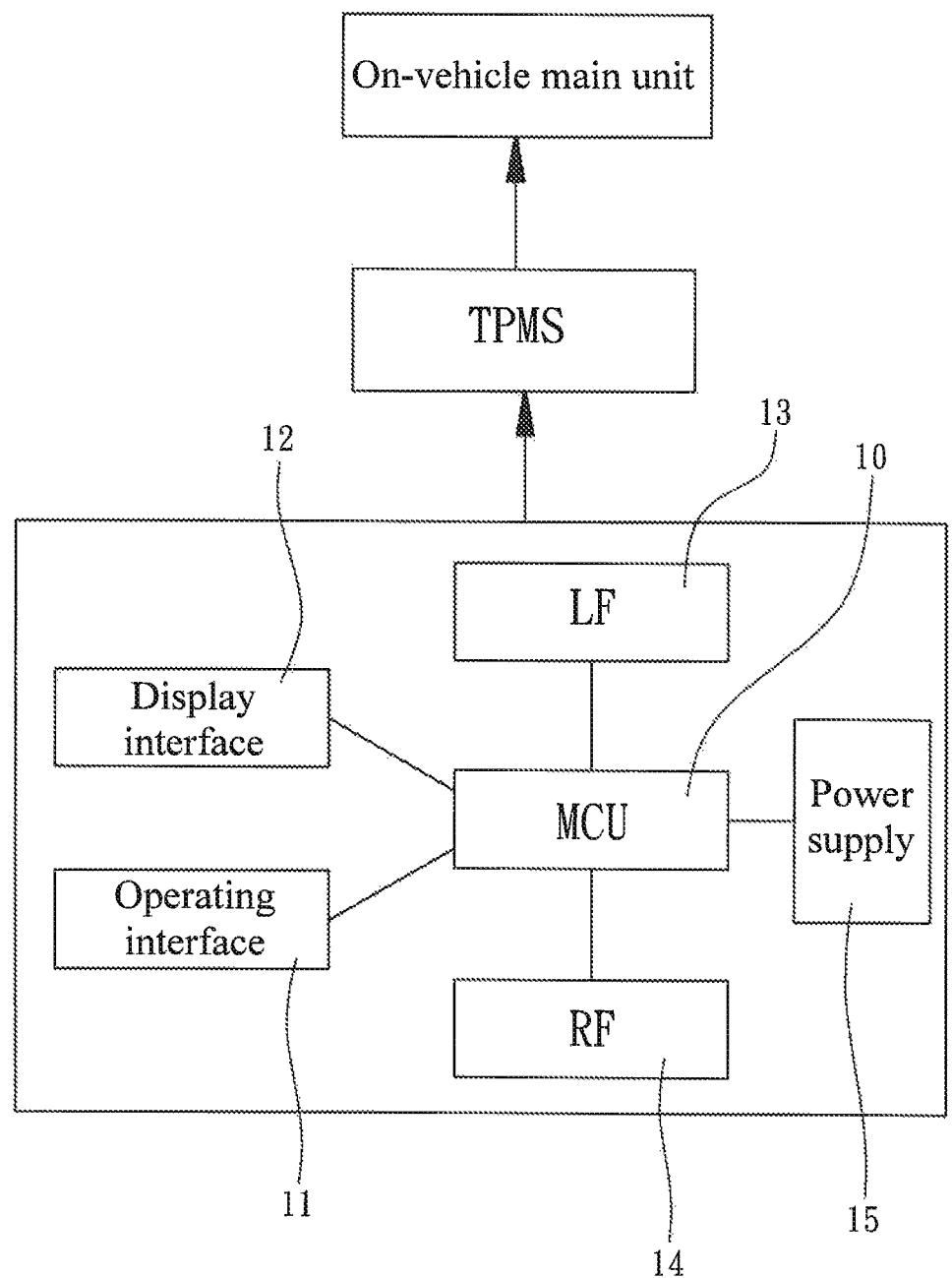
FIG. 2 is a system block diagram of a setting tool in accordance with the present invention.

As illustrated in the system block diagram of the present invention in FIG. 2, the setting tool comprises a MCU 10, the aforesaid operating interface 11, display interface 12 and low-frequency transmitter unit 13 respectively electrically coupled to the MCU 10, a wireless receiver unit 14 electrically connected to the MCU 10 for receiving a wireless signal, and a power supply unit 15 electrically connected to the MCU 10 to provide the setting tool with the necessary working power.

Figure 3:
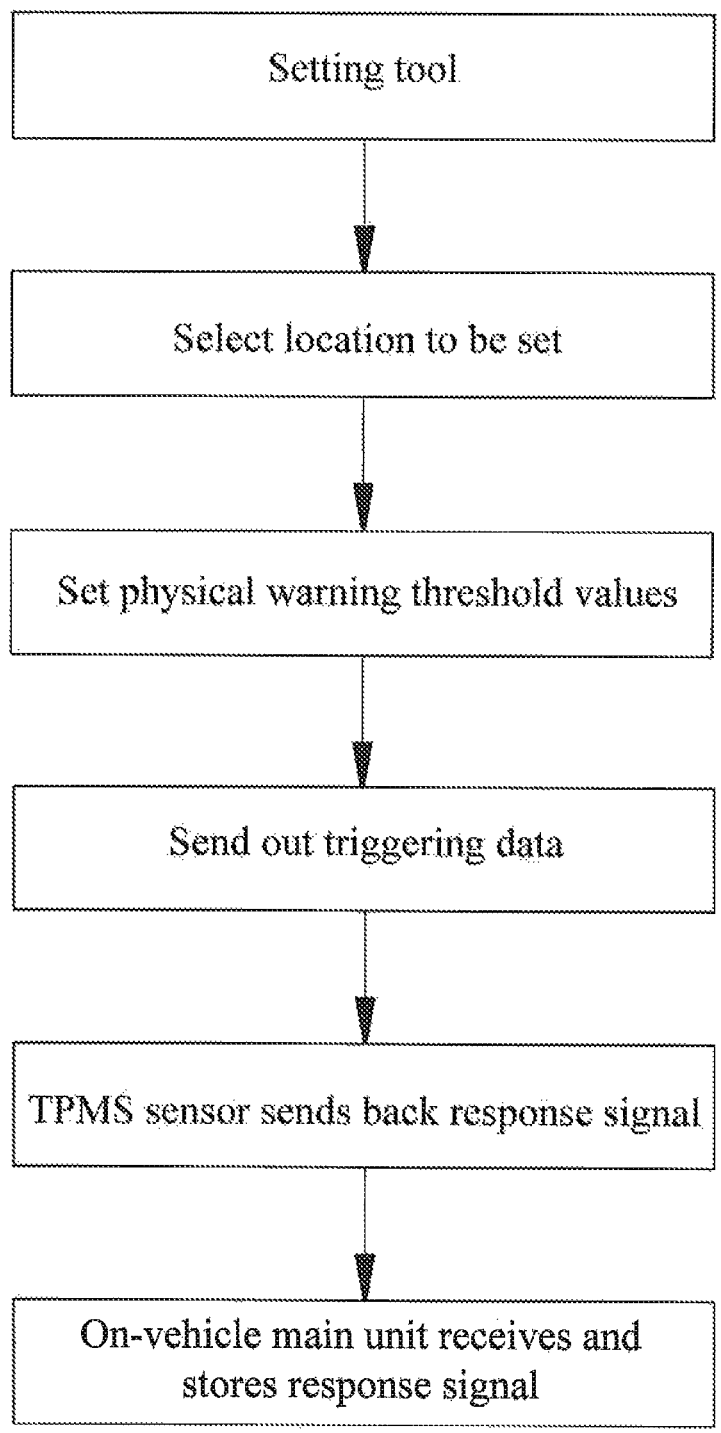
FIG. 3 is an operational flow chart of a TPMS sensor positioning setting method in accordance with a second embodiment of the present invention.

In addition to the setting method in accordance with the aforesaid first embodiment of the present invention for setting the location of a TPMS sensor, the invention can also set physical warning threshold values. FIG. 3 is an operational flow chart of a TPMS sensor positioning setting method in accordance with a second embodiment of the present invention.

According to this second embodiment, the TPMS (tire pressure monitoring system) sensor position setting method comprises the following steps:

A. Provide a setting tool that comprises an operating interface 11, a display interface 12 and a low-frequency transmitter unit 13.

B. Operate the operating interface 11 of the setting tool to select the position of the TPMS sensor, for example, left front wheel for the position of the TPMS sensor to be set, and related physical warning threshold values to be set, for example, 150° C. for temperature warning threshold value and 28 psi for pressure warning threshold value.

C. After selected the position of the TPMS sensor and the related physical warning threshold values; approach the setting tool toward the wheel (left front wheel) of the vehicle to be set, enabling the setting tool to transmit a triggering data to trigger the TPMS sensor in the wheel of the vehicle wirelessly, wherein the triggering data comprises a trigger signal, a location code and physical warning threshold values.

D. After received the triggering data, the TPMS sensor stores the location code and physical warning threshold values of the triggering data provided by the setting tool and then feeds back to the on-vehicle main unit a response signal containing the location code, the ID of the TPMS sensor and all physical information measured by the TPMS sensor such as the temperature, pressure or acceleration value.

E. After received the response signal from the TPMS sensor, the on-vehicle main unit links the ID to the location code and stores them in a memory therein to finish the setting of the TPMS sensor, and thus, the on-vehicle main unit will be able to learn the relationship between tire ID of the TPMS sensor and its location.

Before the setting procedure, the on-vehicle main unit must he switched from the normal mode to the learning mode.

In step B, there is no sequential restriction on the selection of the setting position and the setting of the physical warning threshold values, i.e., the user can set the physical warning threshold values and then select the setting position.

The TPMS sensor position setting method in accordance with the second embodiment of the present invention can link the ID of the TPMS sensor and its location and can also adjust the TPMS sensor physical warning threshold values, eliminating the drawback of the prior art designs that must complete the linking between the ID of the TPMS sensor and its location prior to adjusting the physical warning threshold values through the on-vehicle main unit.

What is claimed is:

1. A TPMS (tire pressure monitoring system) sensor position setting method, comprising the steps of:
    A. providing a setting tool;
    B. operating said setting tool to select the position of the TPMS sensor to be set and to select desired physical warning threshold values;
    C. enabling said setting tool to transmit a triggering data to trigger said TPMS sensor, said triggering data comprising a trigger signal and a location code, wherein said triggering data further comprises said physical warning threshold values, and said triggering data is only transmitted to trigger said TPMS sensor when said triggering data comprises said physical warning threshold values;
    D. said TPMS sensor feeding back to said on-vehicle main unit a response signal containing said location code and an ID of said TPMS sensor after received said trigger signal, wherein said TPMS sensor stores said location code and said physical warning threshold values after received said triggering data; and
    E. said on-vehicle main unit linking said location code and said ID and storing them in a memory therein after received said response signal from said TPMS sensor.

2. The TPMS (tire pressure monitoring system) sensor position setting method as claimed in claim 1, said on-vehicle main unit is switched into a learning mode before the user starts the TPMS (tire pressure monitoring system) sensor position setting method.

3. The TPMS (tire pressure monitoring system) sensor position setting method as claimed in claim 1, wherein said response signal further comprises physical information measured by said TPMS sensor.

4. The TPMS (tire pressure monitoring system) sensor position setting method as claimed in claim 1, wherein said setting tool provides said triggering data at a low frequency.

5. The TPMS (tire pressure monitoring system) sensor position setting method as claimed in claim 1, wherein said TPMS sensor provides said response signal to said on-vehicle main unit in a wireless manner.

6. The TPMS (tire pressure monitoring system) sensor position setting method as claimed in claim 1, wherein said on-vehicle main unit is switched into a learning mode before the user starts the TPMS (tire pressure monitoring system) sensor position setting method.

* * * * *